United States Patent [19]

Santén et al.

[11] 4,439,410

[45] Mar. 27, 1984

[54] METHOD OF MANUFACTURING SILICON FROM POWDERED MATERIAL CONTAINING SILICA

[75] Inventors: Sven Santén, Hofors; John O. Edström, Stocksund, both of Sweden

[73] Assignee: SKF Steel Engineering Aktiebolag, Sweden

[21] Appl. No.: 404,403

[22] Filed: Aug. 2, 1982

[30] Foreign Application Priority Data

Oct. 20, 1981 [SE] Sweden .................................. 8106179

[51] Int. Cl.³ .............................................. C01B 33/02
[52] U.S. Cl. ..................................... 423/350; 204/164
[58] Field of Search ............... 423/349, 350, DIG. 10; 204/164; 156/DIG. 64

[56] References Cited

U.S. PATENT DOCUMENTS 3,257,196  6/1966  Foex ..................................... 422/209

FOREIGN PATENT DOCUMENTS 2924584  6/1979  Fed. Rep. of Germany .

Primary Examiner—Edward J. Meros
Assistant Examiner—Steven Capella
Attorney, Agent, or Firm—Brumbaugh, Graves, Donohue & Raymond

[57] ABSTRACT

Silicon is manufactured from powdered material containing silica by injecting this, optionally together with a reducing agent, into a gas plasma with the help of a carrier gas. Thereafter the silica material thus heated, together with the reducing agent if any and the energy-rich plasma gas, is introduced in a reaction chamber surrounded by solid reducing agent in lump form, so that the silica is caused to melt and is reduced to liquid silicon.

9 Claims, No Drawings

METHOD OF MANUFACTURING SILICON FROM POWDERED MATERIAL CONTAINING SILICA

DESCRIPTION

The present invention relates to a method of manufacturing silicon from powdered material containing silica.

The world annual production at the time of the present application is in the vicinity of 2 million tons of silicon per year, 5% of which is used for the manufacture of pure silicon and the remainder in the iron and aluminium industries. 10% of the pure silicon is used in the semiconductor industry, i.e. about 10,000 ton.

The consumption of silicon is expected to increase drastically during the next few decades, primarily because there is considerable interest in utilizing solar energy to generate electricity. Pure silicon is preferably used in solar cells, in a quality designated as "solar grade" having a purity of about 99.99%. The type of impurity is also of considerable importance and the choice of raw product is therefore critical.

Most pure silicon is manufactured by direct reduction in electric arc furnaces, which produces a grade known as metallurgical grade. The purity here is about 98%. To be of use in solar cells, this silicon must be purified by dissolving and separating out the impurities. The extremely pure silicon material thus becomes extremely expensive, making it unprofitable to generate electricity with solar cells made from the silicon.

Intensive development is in progress to find methods enabling less expensive production of extremely pure silicon. One method is to use purer raw materials. However, this alone is not enough to make the processes profitable. Electric arc furnaces require starting material in lump form which limits the choice of raw materials and makes it more difficult to use extremely pure raw products. Furthermore, the silica particles must be agglomerated with the help of some form of binder before they can be used, which makes the processes even more expensive.

The arc furnace method is also sensitive to the electric properties of the raw products and the use of reducing agents with low impurity content is thus complicated. Since lump-type material must be used as starting material, poorer contact is obtained locally between silica and reducing agent, giving rise to SiO waste. This waste is also increased since extremely high temperatures occur locally with this process. Furthermore, it is extremely difficult to maintain absolutely reducing conditions in the gas chamber in an arc furnace and the SiO produced is re-oxidized to $SiO_2$.

The factors described above cause most of the losses in this known process, as can also be seen from the electricity consumption measured for this known process, which is 25–45 MWh/ton as against an estimated theoretical electricity consumption of 9 MWh/ton. Finally, the SiO waste and the re-oxidation of SiO to $SiO_2$, result in considerable interruptions in operation since the gas ducts become clogged.

The present invention enables the manufacture of silicon in a single step from powdered raw materials by a method which comprises injecting silica-containing powdered material with a carrier gas and optionally a reducing agent, into a gas plasma to heat the silica containing powdered material, and introducing the heated silica-containing powdered material, the reducing agent, if present, and energy-rich plasma gas, into a reduction zone surrounded by solid reducing agent in lump form.

This method makes it possible to concentrate the whole reaction sequence in a considerably restricted reaction zone in direct connection with the tuyère hole, so that the high temperature volume in the process can be restricted. This is a great advantage over earlier known processes, where the reduction reactions occur successively over a large furnace volume.

By formulating the method so that all reactions take place in a reaction zone in the coke staple directly before the plasma generator, the reaction zone can be held at a very high and controllable temperature level, whereby the reaction $$SiO_2 + 2C \rightarrow Si + 2CO$$

is favoured. All reactants ($SiO_2$, SiO, SiC, Si, C, CO) are simultaneously in the reaction zone, whereby the products SiO and SiC formed in smaller quantities immediately react as follows:

$$SiO + C \rightarrow Si + CO$$

$$SiO + SiC \rightarrow 2Si + CO$$

$$2SiC + SiO_2 \rightarrow 3Si + 2CO$$

The final products leaving the reaction zone are thus in all cases fluid Si and gaseous CO.

The use of powdered raw materials according to the invention facilitates the choice and enables the use of less expensive highly pure silica raw materials. The process according to the invention is also insensitive to the electrical properties of the raw material, which facilitates the choice of reducing agent.

The reducing agent injected may be hydrocarbon, such as natural gas, coal dust, charcoal dust, carbon black, petroleum coke which may be puried, and coke gravel.

The temperature required for the process can easily be controlled with the aid of the quantity of electrical energy supplied per unit of plasma gas so that optimum conditions can be maintained to give the least SiO waste.

Since the reaction chamber is surrounded substantially completely by lump-type reducing agent, re-oxidization of SiO is effectively prevented.

According to a preferred embodiment of the invention the solid reducing agent in lump form is supplied continuously to the reaction zone as it is consumed.

The lump-type reducing agent may suitably be coke, charcoal, petroleum coke and/or carbon black and the plasma gas used for the process may suitably consist of process gas recirculated from the reaction zone.

The solid lump-type reducing agent may be a powder converted to lump form with the aid of a binder composed of C and H and possibly O as well, such as sucrose.

According to another embodiment of the invention, the plasma burner used is an inductive plasma burner, so that impurities from the electrodes are reduced to an absolute minimum.

The method according to the invention is ideal for the manufacture of highly pure silicon, e.g. with a degree of pollution of at most 100 ppm by weight to be used in solar cells and/or semi-conductors. Extremely pure silica and reducing agent with very low impurity contents can be used as raw materials.

The following is a description of a preferred way of carrying out the method of the invention. The reactions are preferably performed in a reactor similar to a shaft furnace, which is continuously charged with a solid reducing agent through a blast furnace top, for instance, having uniformly distributed and closed supply channels or an annular supply pipe at the periphery of the shaft.

The powdered siliceous material, possibly prereduced, is blown in through tuyères at the bottom of the reactor with the aid of an inert or reducing gas. At the same time hydrocarbon can be blown in and possibly also oxygen, preferably through the same tuyères.

At the lower part of the shaft filled with reducing agent in lump form is a reaction chamber surrounded on all sides by the reducing agent in lump form. This is where the reduction of the silica and melting take place instantaneously to produce liquid silicon.

The reactor gas leaving, comprising a mixture of carbon monoxide and hydrogen in high concentration, can be recirculated and used as carrier gas for the plasma gas.

The following Examples serve further to illustrate the invention.

EXAMPLE 1

An experiment was performed on half scale. Crushed quartz of rock-crystal type with an impurity content of less than 100 ppm and a particle size of approximately 0.1 mm was used as raw silicon product. The "reaction chamber" consisted of carbon black briquettes. Propane (liquified petroleum) was used as reducing agent, and washed reduction gas comprising CO and $H_2$ was used as carrier gas and plasma gas.

The electric power supplied was 1000 kW.h. 2.5 kg $SiO_2$/minute was supplied as raw material and 1.5 kg propane/minute as reducing agent.

A total of about 300 kg highly pure Si was produced in the experiment. The average electricity consumption was about 15 kWh/kg Si produced.

The experiment was performed on a small scale and the heat loss was therefore considerable. The electricity consumption can be reduced further with gas recovery, and the thermal losses will also decrease considerably in a larger plant.

EXAMPLE 2

Under otherwise the same conditions as in Example 1, highly pure silicon was produced using powdered carbon black as reducing agent. 1.2 kg carbon black per minute was supplied. In this experiment 200 kg highly pure Si were produced. The average power consumption was about 13.5 kWh/kg Si produced.

We claim:

1. A continuous method of manufacturing silicon from silica-containing powdered material, which comprises the steps of: continuously injecting the silica-containing powdered material with a carrier gas, and optionally a reducing agent, into a gas plasma to heat the silica-containing powdered material, introducing the heated silica-containing powdered material, the reducing agent, if present and energy-rich plasma gas, into a reaction zone in a furnace which contains a solid reducing agent in lump form, said reaction zone being surrounded by said solid reducing agent in lump form, reacting said silica-containing powdered material with reducing agent so as to produce silicon, and continuously charging said furnace with said solid reducing agent in lump form as said solid reducing agent in lump form is consumed by the reaction of the silica-containing powdered material.

2. Method according to claim 1, which comprises generating the gas plasma by allowing a plasma gas to pass an electric arc in a plasma generator.

3. Method according to claim 2, which comprises generating the arc in the plasma generator inductively.

4. Method according to claim 1, 2 or 3 which comprises generating the plasma gas from process gas recirculated from the reaction zone.

5. Method according to claim 1 for the production of extremely pure silicon intended as the raw material for solar cells and/or semiconductors, in which the silica-containing powdered material used as starting material is selected having a degree of pollution of less than 0.1 percent by weight.

6. Method according to claim 1, 2 or 3 which the solid reducing agent in lump form consists of charcoal or coke.

7. Method according to claim 5, in which the solid lump-type reducing agent is selected from a group consisting of carbon black briquettes, petroleum coke briquettes, charcoal briquettes and lumps of charcoal.

8. Method according to claim 1 which comprises injecting the silica-containing powdered material with a reducing agent which is selected from a group consisting of powdered carbon black, charcoal dust, petroleum coke and hydrocarbon in gas and liquid forms.

9. Method according to claim 8 in which the reducing agent is selected from the group consisting of natural gas, propane and light gasoline.

* * * * *